(12) United States Patent
Slicker

(10) Patent No.: US 8,136,941 B2
(45) Date of Patent: Mar. 20, 2012

(54) LIGHT DISPERSION EYEGLASS NOSE PAD

(75) Inventor: James Melvin Slicker, West Bloomfield, MI (US)

(73) Assignee: Hardisty Optical Group, LLC, West Bloomfield, MI (US)

( * ) Notice: Subject to any disclaimer, the term of this patent is extended or adjusted under 35 U.S.C. 154(b) by 0 days.

(21) Appl. No.: 12/999,200

(22) PCT Filed: Jun. 16, 2009

(86) PCT No.: PCT/US2009/047503
§ 371 (c)(1),
(2), (4) Date: Jan. 12, 2011

(87) PCT Pub. No.: WO2010/005717
PCT Pub. Date: Jan. 14, 2010

(65) Prior Publication Data
US 2011/0096287 A1    Apr. 28, 2011

Related U.S. Application Data

(60) Provisional application No. 61/190,637, filed on Sep. 2, 2008, provisional application No. 61/132,061, filed on Jun. 16, 2008.

(51) Int. Cl.
*G02C 5/12* (2006.01)
(52) U.S. Cl. .................................. 351/136; 600/556
(58) Field of Classification Search .......... 351/136–139, 351/122; 600/310, 556
See application file for complete search history.

(56) References Cited

U.S. PATENT DOCUMENTS

| | | | |
|---|---|---|---|
| 0,862,789 A | 8/1907 | Bausch | |
| 4,045,137 A | 8/1977 | Bradley, Jr. | |
| 4,190,334 A | 2/1980 | O'Neil | |
| 4,251,302 A | 2/1981 | Leonard et al. | |
| 4,424,710 A | 1/1984 | Von Nortwick, II | |
| 4,787,729 A | 11/1988 | Ruffen | |
| 4,806,009 A | 2/1989 | Sordillo et al. | |

(Continued)

FOREIGN PATENT DOCUMENTS

JP    7294857 A    11/1995

(Continued)

OTHER PUBLICATIONS

Korean Intellectual Property Office; International Search Report and Written Opinion of the ISA issued in corresponding International Application No. PCT/US2009/047503. Date of Mailing: Jan. 20, 2010.

(Continued)

*Primary Examiner* — Huy K Mai
(74) *Attorney, Agent, or Firm* — Dykema Gossett PLLC

(57) ABSTRACT

A nose pad for supporting eyeglasses on a nose is disclosed. The nose pad includes a first surface and a second surface, the second surface opposing the first surface and including a contact portion configured to contact a wearer's nose. In an embodiment, the first surface includes a first outer edge portion, a second outer edge portion, and a central portion that is provided between the first outer edge portion and the second outer edge portion. In an embodiment, the first outer edge portion, the second outer edge portion, and the central portion are configured so that light directed at the first surface and passing through the second surface is dispersed so that the light is not concentrated on a wearer's nose.

25 Claims, 7 Drawing Sheets

U.S. PATENT DOCUMENTS

| | | |
|---|---|---|
| 4,813,776 A | 3/1989 | Borsos |
| 4,834,524 A | 5/1989 | Borsos |
| 4,902,119 A | 2/1990 | Porsche |
| 4,924,245 A | 5/1990 | Dianitsch |
| 5,015,087 A | 5/1991 | Baratelli |
| 5,167,036 A | 12/1992 | Daprato |
| 5,189,447 A | 2/1993 | Oleson |
| 5,196,871 A | 3/1993 | Tom |
| 5,351,099 A | 9/1994 | Winkler et al. |
| 5,355,185 A | 10/1994 | Lee |
| 5,416,923 A | 5/1995 | Peugh |
| 5,526,070 A | 6/1996 | Simioni |
| 5,572,265 A | 11/1996 | Hasegawa |
| 5,583,587 A | 12/1996 | Hasegawa |
| 5,717,992 A | 2/1998 | Tilghman |
| 5,784,143 A | 7/1998 | Chang |
| 5,907,385 A | 5/1999 | Flores et al. |
| 5,971,538 A | 10/1999 | Heffner |
| 6,045,223 A | 4/2000 | Kawabata |
| 6,056,398 A | 5/2000 | Negishi |
| 6,056,399 A | 5/2000 | Jannard et al. |
| 6,065,834 A | 5/2000 | Willhite |
| 6,079,825 A | 6/2000 | Chen |
| 6,283,592 B1 | 9/2001 | Lin |
| 6,386,705 B1 | 5/2002 | Chen |
| 6,582,074 B1 | 6/2003 | Chen |
| 6,644,806 B2 * | 11/2003 | Wu .................... 351/122 |
| 6,834,953 B1 | 12/2004 | Nevak |
| 7,111,936 B1 | 9/2006 | Chuang |
| 7,314,277 B2 | 1/2008 | Lin |
| 7,513,618 B2 | 4/2009 | Mikame |
| 2005/0046788 A1 | 3/2005 | Ryushima |
| 2009/0051867 A1* | 2/2009 | Mikame .................... 351/136 |
| 2009/0086157 A1 | 4/2009 | Schmied |

FOREIGN PATENT DOCUMENTS

| | | |
|---|---|---|
| JP | 2004348097 A | 12/2004 |
| JP | 2005091851 A | 4/2005 |
| JP | 2005107396 A | 4/2005 |
| JP | 2005326558 A | 11/2005 |
| JP | 2006106273 A | 4/2006 |
| KR | 890009469 Y1 | 12/1989 |
| KR | 20030071177 A | 9/2003 |
| KR | 200403687 Y1 | 12/2005 |
| WO | 0036453 A1 | 6/2000 |

OTHER PUBLICATIONS

Korean Intellectual Property Office; International Preliminary Report on Patentability issued in corresponding International Application No. PCT/US2009/047503. Date of Mailing: Dec. 18, 2010.

* cited by examiner

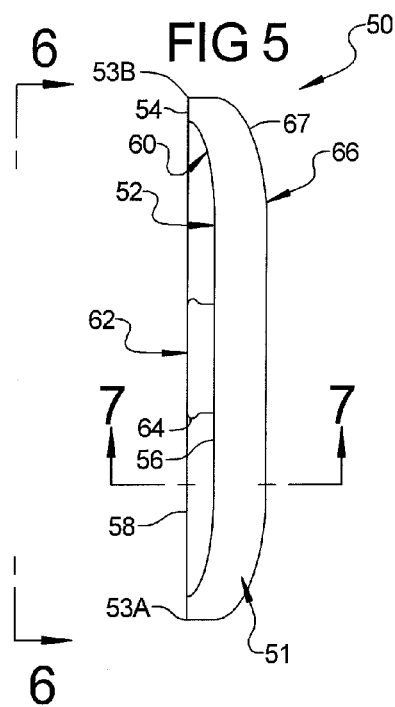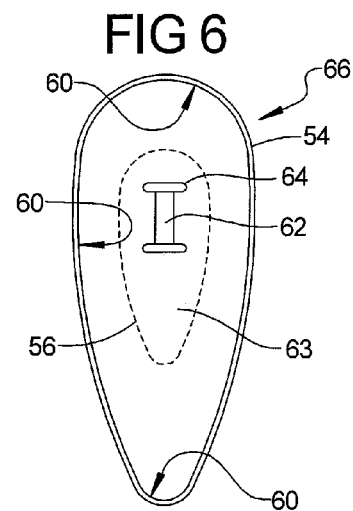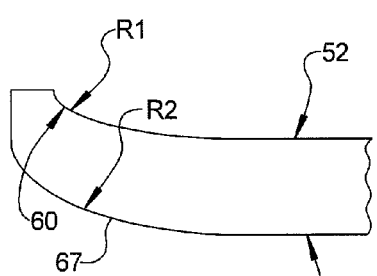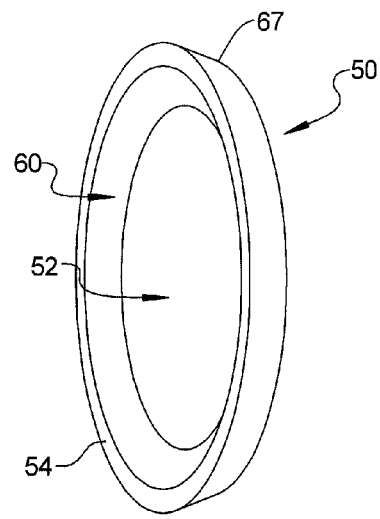

LIGHT DISPERSION EYEGLASS NOSE PAD

CROSS REFERENCE TO RELATED APPLICATIONS

This application is a national stage filing based upon International PCT Application No. PCT/US2009/047503, with an international filing date of Jun. 16, 2009, which claims the benefit of the filing date of provisional application Ser. Nos. 61/190,637 and 61/132,061 filed Sep. 2, 2008 and Jun. 16, 2008, respectively, both of which are incorporated by reference in their entirety as if fully set forth herein.

BACKGROUND

Eyeglasses are generally supported on the wearer's nose by nose pads, which are mounted on the eyeglass frames and contact the wearer's nose. These nose pads are typically made of plastic or silicone material, which are shaped to be comfortable for the wearer.

It is known that people who wear eyeglasses can develop basil or more serious cancerous cells in the region of the nose that is contacted by the eyeglass nose pads. It is known that intense ultra-violet light can result in the growth of cancer cells on human skin. Commercially available nose pads can result in the concentration of the incident light energy that strikes the surface of the nose pad that is attached to the eyeglass frame. The light rays travel through the nose pad to the opposite side and, when exiting, the light rays are optically focused onto certain areas on the side the wearer's nose. The result is that there are areas of concentrated light that strike the wearer's nose, due to the optical design of the nose pad, which optically concentrates the light. Essentially, the nose pad acts as a magnifying glass concentrating the incident light energy onto the skin of the wearer's nose. This increases the chance that the skin under the nose pad will develop an abnormality such as skin cancer. A problem to be solved is that the prior art transparent nose pad designs act to increase the localized intensity of light falling on the wearer's nose thereby increasing the chance of cancerous cells forming on the root section of the wearer's nose.

SUMMARY

The present invention provides for an eyeglass nose pad that helps to even out the light intensity of the incident sunlight that passes through the nose pad onto the wearer's nose. This is accomplished, at least in part, by altering the shape of the nose pad that is attached to the eyeglass frame. Thus, the light rays that eventually may strike the wearer's nose are not concentrated. This consequently results in a reduction in the light intensity that strikes the wearer's nose directly opposite the surface (outer edge) of the nose pad that contacts the nose.

According to the present invention, the shape of the eyeglass nose pad is specified according to the optical transmission characteristics of the light through the nose pad. The contours of both the first surface (surface that is attached to the eyeglass frame) and the second surface (surface that contacts the side of the nose) are specified to disperse the light that travels through the nose pad so it is not concentrated in any one section as it strikes the wearer's nose. The result is that the level of the ultraviolet (UV) light intensity that strikes the wearer's nose is reduced and this has advantages over the prior art.

In another embodiment, the intensity of the localized light that strikes the nose from the second surface is reduced by introducing a wavy first surface thereby acting to periodically disperse the light rays.

In another embodiment, the intensity of the localized light that strikes the nose from the second surface is reduced by introducing a rough first surface thereby acting to randomly disperse the light rays.

In still another embodiment, only the outer edge of the first surface of the nose pad is roughened to reduce the intensity of the light rays that strike the first surface in a perpendicular orientation to the nose pad.

BRIEF DESCRIPTION OF THE DRAWINGS

FIG. 5 is a cross-sectional view of a first embodiment of the nose pad of the present invention.

FIG. 6 is a plan view of a first embodiment of the nose pad of the present invention.

FIG. 7 is a partial sectioned view of a first embodiment of the nose pad of the present invention.

FIG. 8 is an illustrative perspective view of a first embodiment of the nose pad of the present invention.

DETAILED DESCRIPTION

Figure 1:
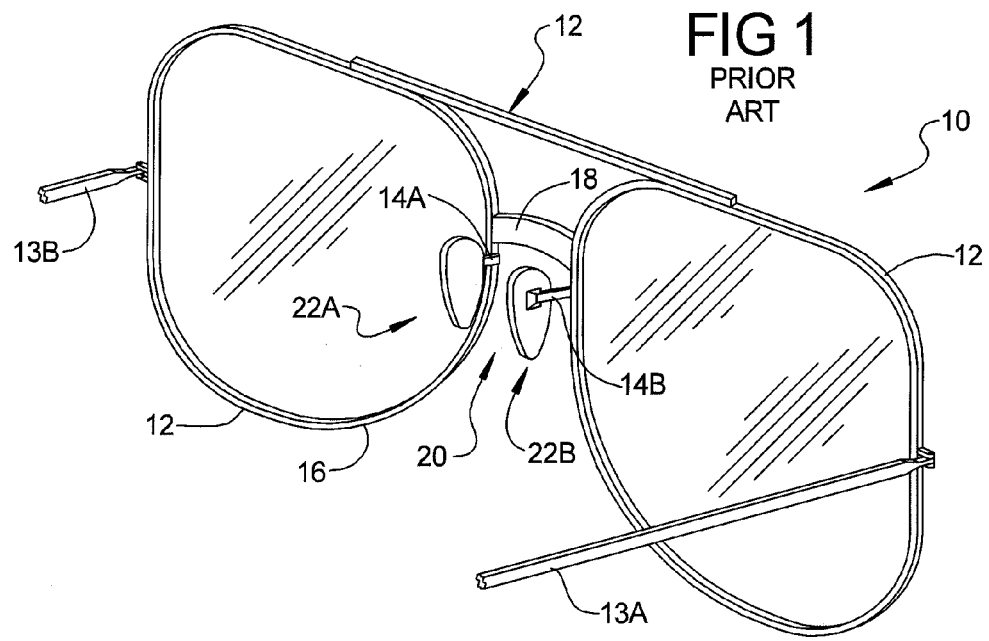
FIG. 1 is a perspective view of a prior art eyeglass frame, having prior art nose pads.

Referring to FIG. 1 of the drawings, a perspective view of a prior art eyeglass frame 12 including temples 13A, 13B and having prior art nose pads 22A, 22B (which can be identical or a left and right)) attached to nose piece arms 14A, 14B is shown. Temples 13A and 13B support the eyeglass frame on the wearer's ears. The nose pads 22A, 22B which support the eyeglass frames on the wearer's nose along the support area 20 are typically substantially transparent and made of materials such as plastic or silicone. Silicone is particularly popular because it is not only substantially transparent for aesthetic reasons but is also resistant to sliding on the bridge of the wearer's nose. Unfortunately, the typical geometry of these prior art nose pads 22A, 22B concentrates incident light rays from the sun at the bridge or root of the wearer's nose. The light rays that fall on the surface of the nose pads 22A, 22B attached to the nose piece arms 14A, 14B pass through the nose pads 22A, 22B and are affected by the optical properties of the nose pads 22A, 22B.

Figure 2:
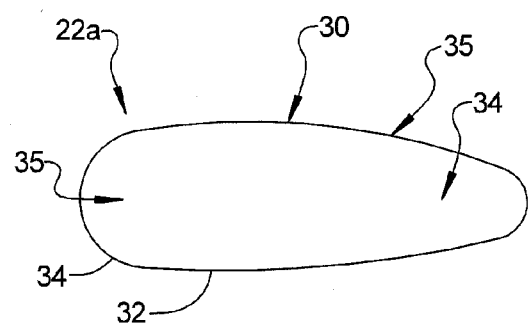
FIG. 2 is a cross-sectional view of the prior art nose pad of FIG. 1.

Now referring to FIG. 2, a cross-sectional view of a typical nose pad 22A, 22B is shown. As these light rays translate through the outer edge of the nose pad 22A, 22B, they are refracted and exit from the second respective surface 32 onto the wearer's nose in a concentrated state in certain areas, primarily along the edge of the nose pads 22A, 22B. This concentrated light increases the risk of nose cancer. Now referring only to nose pad 22A as representative of the geometry of prior art nose pads, the nose pad 22A has a first surface 30 and a second surface 32 which are joined by a curved portion 34. Note that both the first surface 30 and the second surface 32 are convex shapes where the first surface 30 is attached to a nose piece as shown in FIG. 1 and where the second surface 32 is intended to rest against the wearer's nose (not shown). Both the first surface 30 and second surface 32 are in some cases flat rather than convex but either design exhibits the same concentrative effect at the outer edge section 35. Incident light rays which strike the edge of the prior art nose pads 22A, 22B at or close to the curved portion 34 at an outer edge section 35 will be refracted by the optical characteristic of the silicone nose pad geometry and as they exit the nose pad 22A, 22B at the outer edge section 35 are concentrated in certain areas as on the side of the wearer's nose. This increases the local intensity of the UVA and UVB sun rays by about 1.4 to 2.0 times the intensity of the incident light striking the first surface 30. This local light intensification results in an increased likelihood that the skin cancer will occur in that area of the wearer's nose.

Figure 3:
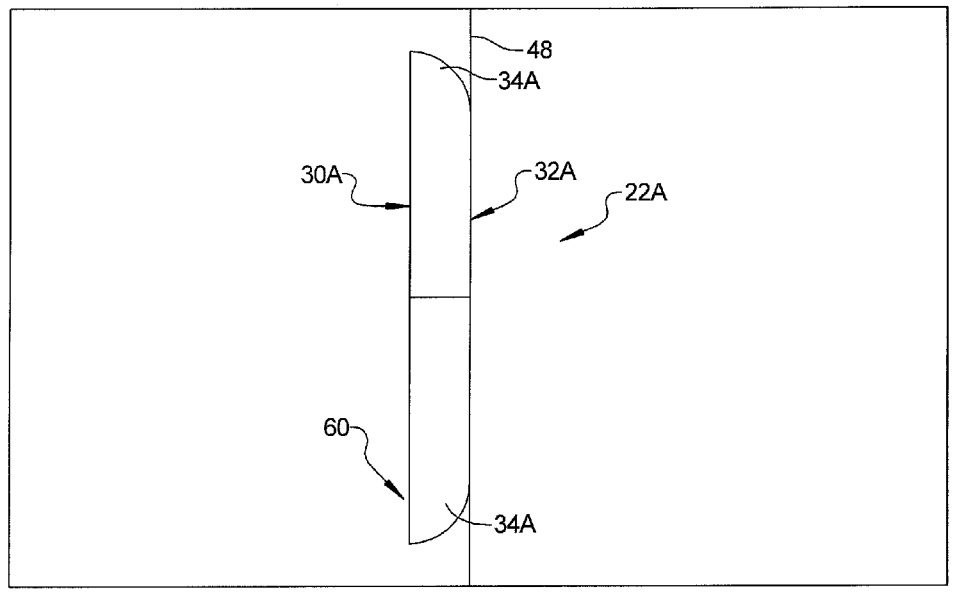
FIG. 3 is an illustrative cross-section of a prior art nose pad of FIG. 2.
Figure 4:
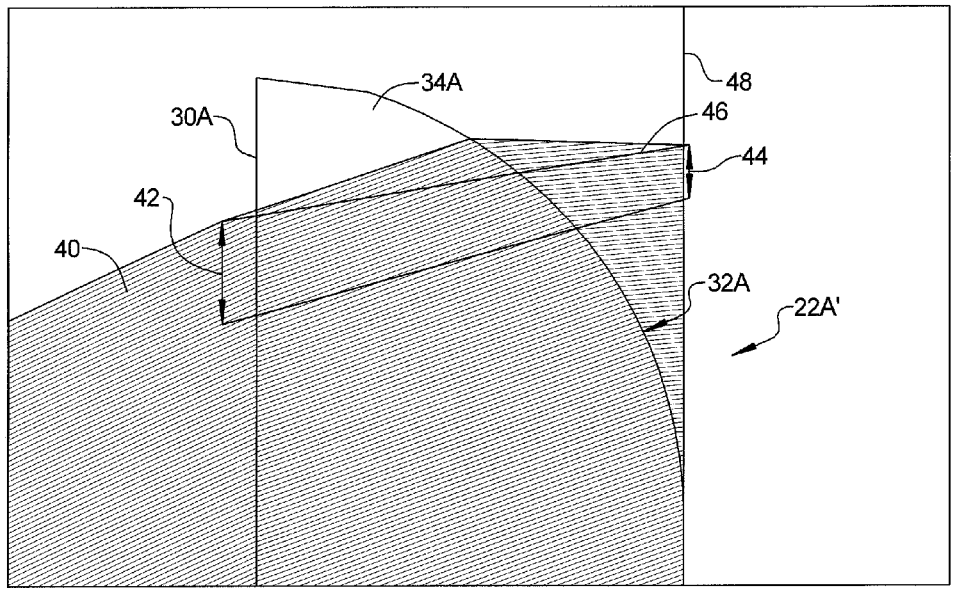
FIG. 4 is a cross-sectional view of a prior art nose pad which shows the optical effect of the prior art geometry.

An illustrative cross-section of a prior art nose pad 22A of FIG. 1 is shown in FIG. 3. In this embodiment, the first surface 30A is flat and the second surface 32A is smaller and shorter than the first surface 30A with the surfaces joined with a curved portion 34A. The optical effect of this geometry is graphically shown in the partial cross-sectional view of FIG. 3 as shown in FIG. 4. Parallel incident light rays 40 strike the first surface 30A which is attached to the nose piece arms 14A as shown in FIG. 1. For purposes of analysis, the multiplicity of incident sunlight rays 40 striking section 42 are refracted as they exit the body of the prior art nose pad 22A' at the curved surface 34A. Due to the optical properties of the nose pad 22A', the light rays 40 become concentrated when they strike the wearer's nose along the nose surface 48. The length of the exit section 44 encompasses the same number of representative light rays as the incident light rays 40 across section 42. This concentration is at an intensity level of approximately 1.4 to 2.0 times the intensity level the incident light as incident section 42. This is shown by the relative width of the incident section 42 as compared to the exit section 44.

Referring now to FIG. 5 a cross-sectional view of a first embodiment of the nose pad 50 of the present invention is shown. The first surface 52 consists of outer edge 54, radiused section 60, and central section 56. For this discussion, the first surface in FIG. 5 and in subsequent cross sectional figures is defined as the portion of the nose pad on the eyeglass side between points 53A and 53B. Central section 56 is approximately parallel to the line 58 formed by the outer edge 54. The outer edge 54 is joined to the central section 56 by radiused section 60. The shape of the radiused section 60 is further defined by reference to FIGS. 12 and 13. A mounting piece 62 is attached to the first surface 52 in a central location for eventual attachment to the nose piece arm 14A, 14B as shown in FIG. 1. One method of attachment for when the nose pad material is silicone is to embed a hard piece of plastic 63 in the silicone where the plastic embodies a protruding sections 64 and a mounting piece 62 for retaining the nose pad 50 to the eyeglass frame 12 by engaging an aperture section (not shown) formed in the nose piece arm 14A, 14B. The hard plastic piece 63 provides stiffness to the silicone and a more effective attachment method to the eyeglass frame 12.

The second surface 66 of the nose pad 50 is either slightly convex or it can be flat as referenced to line 58 formed across the outer edge 54. Second surface 66 is designed to rest against the wearer's nose thereby supporting the eyeglasses 10 on the bridge of the nose. The first surface 52 is joined to the second surface 66 by curved section 67.

Now referring to FIG. 6 a plan view of the nose pad 66 of FIG. 5 is shown as view A-A. Outer edge 54 is joined to the central section 56 by the radiused section 60. The mounting piece 62 is shown attached to the embedded plastic piece 63 The protruding section 64 is a part of the mounting piece 62 that retains the nose pad 66 in an aperture section (not shown) forced in the nose piece arm 14A, 14B (see FIG. 1).

FIG. 7 is a partial sectioned view of the nose pad 50 of FIG. 5 along section B-B. Clearly shown is the geometry of the radiused section 60 which in this embodiment consists of radius R1, which is selected to generate a dispersion of the incident sun rays which strike the first surface 52 of the nose pad 50. This effect is discussed in more detail in reference to FIGS. 9 and 10. Radius R2 forms the curved section 67 and provides for the comfort of the wearer since the second surface 66 rests against the wearer's nose. The shape of the radiused section 60 can be specified as required to disperse the incident light rays so that the intensity of the light rays striking the wearer's nose is minimized. Additional shapes are disclosed with reference to FIGS. 11, 12, 13. Radius R2 can also be shaped to cooperate with the radiused section 60 to disperse the light rays striking the wearer's nose.

FIG. 8 Is a illustrative perspective view of an embodiment of the nose pad 50 of the present invention from an angle more clearly showing the first surface 52, the outer edge 54 and the radiused sections 60 and 67. Not shown is the mounting piece 62. The shape of the nose pad 50 is shown as circular but oblong shapes are more common.

Figure 9:
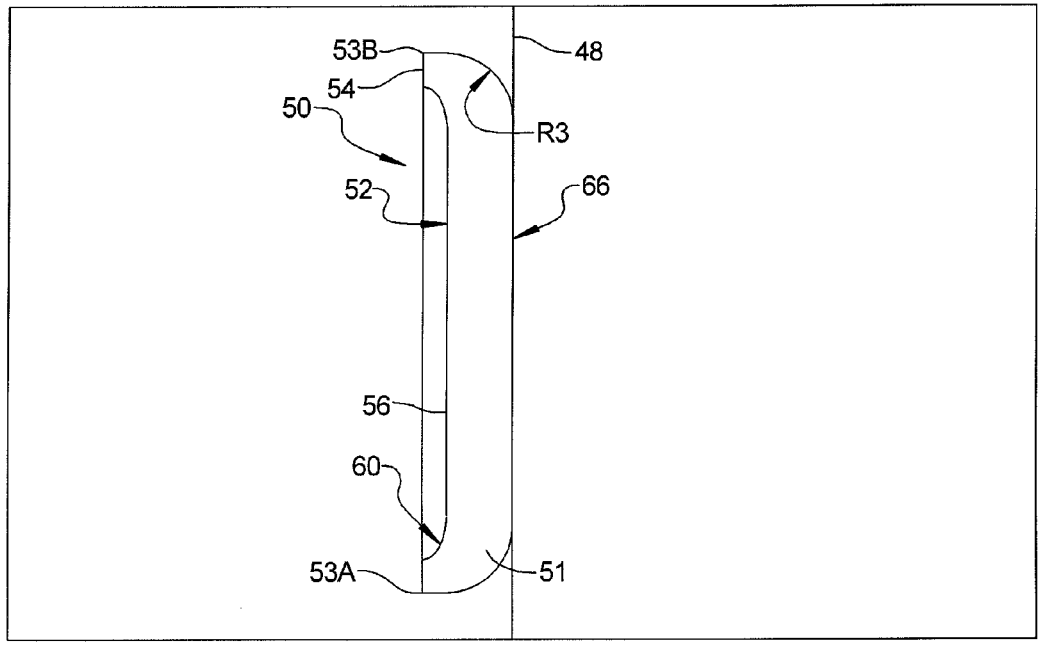
FIG. 9 is an illustrative cross-sectional view of a first embodiment of the nose pad of the present invention.
Figure 10:
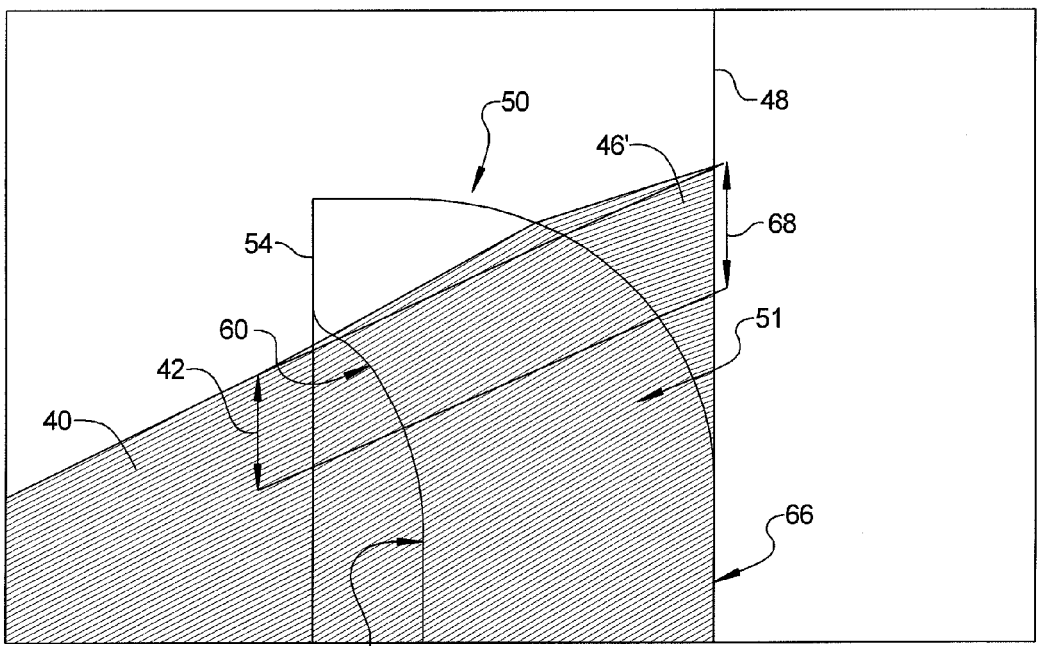
FIG. 10 is an illustrative cross-sectional view that shows the effect on incident light rays of the first embodiment of the nose pad of the present invention.

Now referring to FIGS. 9 and 10, an illustrative cross-sectional view of an embodiment of the nose pad 50 of the present invention is shown along with nose contact line 48 representing the outside of the bridge root portion of the wearer's nose. Incident light rays 40 strike the first surface 52 at the radiused section 60 and then pass through the nose pad 50 exiting from the second surface 66 and strike the wearer's nose at the contact line 48.

Note that the light rays 46' that strike the wearer's nose at exit section 68 is much wider than the exit section 44 shown in FIG. 4 of the prior art nose pad 22A'. The width of the exit section 68 encompasses the same number of representative light rays as those incident light rays 40 across the incident section 42. Since the length of incident line 42 and exit line 68 are approximately equal, there is virtually no concentration of the light rays striking the wearer's nose along nose line 48 unlike the prior art nose pad 22A.

Figure 11:
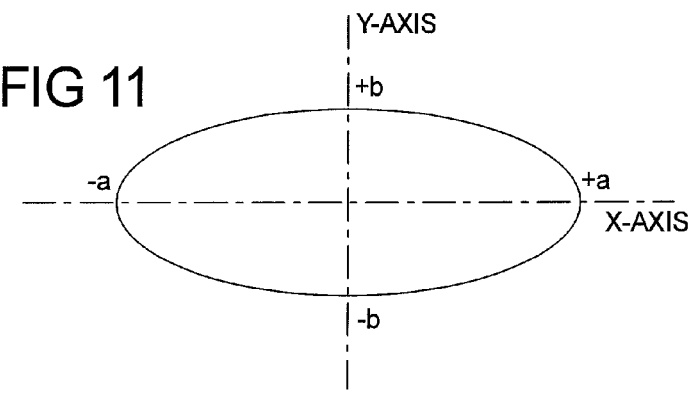
FIG. 11 is an illustrative view of an elliptical curve shape in terms of parameters, a, and b.
Figure 12:
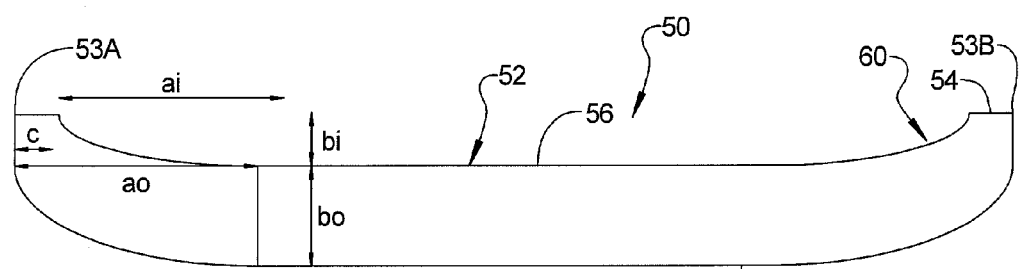
FIG. 12 is a cross-sectional view of the first embodiment of the nose pad of the present invention.
Figure 13:
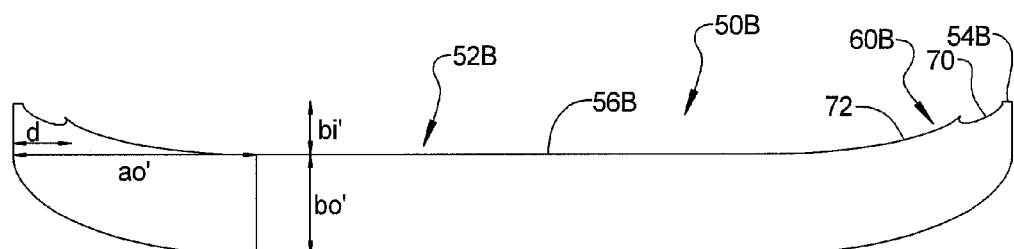
FIG. 13 is an illustrative cross-section of a first alternative embodiment of the nose pad of the present invention.

Now referring to FIG. 11, an illustrative elliptical curve shape is shown which is used to explain the geometries of the radiused sections of FIGS. 12 and 13 with reference to an ellipse. The general equation for an ellipse is:

$$\frac{x^2}{a^2} + \frac{y^2}{b^2} = 1$$

where x and y define points on the ellipse in a plane in an x, y coordinate system and parameters a and b define the width and height of the ellipse respectively as shown in FIG. 11.

The general shape of the ellipse in terms of parameters a and b is shown in FIG. 11. Since most of the nose pad surface is flat, the surface is curved only at the ends, one need only use a one quarter section of an ellipse to define the nose pad 52A, 52B as shown in FIGS. 12 and 13. Thus the second surface 66A, 66B of the nose pad 50A, 50B is defined by a straight line whose length is linked to the size of the nose pad 52A, 52B plus a quarter section of an ellipse which is appended at each end of the straight line.

Now referring to FIG. 12 an illustrative cross-section of the embodiment of the nose pad 50 of the present invention as first shown in FIG. 9 is shown in FIG. 12. The first surface 52 consists of the central section 56, outer edge 54, and radiused section 60 which is formed as a quarter of an ellipse. Central section 56 is joined to outer edge 54 by radiused section 60. The quarter section of the ellipse 1 will have width, ai, and, height bi. The second surface 66 of the nose pad 50 can be defined by another ellipse 2 placed relative to the second surface 66 whose width and height are given as ao, and bo respectively as shown in FIG. 12. The offset along the length of the nose pad 50 for the first surface ellipse from the second surface ellipse is defined by the single parameter c. The thickness of the eyeglass nose pad 50 measured at the mid-section of the nose pad is given as bo. Thus the nose pad cross-sectional shape is defined by five parameters, ao, bo, ai, bi, c is shown in FIG. 12. By way of example, values in mm for ao, bo, ai, bi, c of 2.5, 2, 2, 1 and 0.5, respectively have been shown to produce the desired results. These values are for example only and other values for ao, bo, ai, bi, c also may produce desired results.

Now referring to FIG. 13, an illustrative cross-section of a first alternative embodiment of the nose pad 50B of the present invention is shown. The radiused section 60 of FIG. 12 has been modified to include a cusp 70. The new radiused section 60B includes the outer edge 54B, the cusp 70 and an elliptical section 72.

The above design shown in FIG. 12 is suitable for light entering the first surface 52B of the nose pad 50B at an angle other than perpendicular to it. Although non perpendicular light is usually the case, light entering the nose pad 50B perpendicularly is possible. In this case the possibility of light concentrating on the skin is possible with the design shown in FIG. 12. The addition of a cusp 70 at the radiused section 60B of the first surface 56B of the nose pad addresses this special case, as shown in FIG. 13. Note that the cusp extends over a distance d from the outer edge 54B to meet the elliptical section 72.

Figure 14:
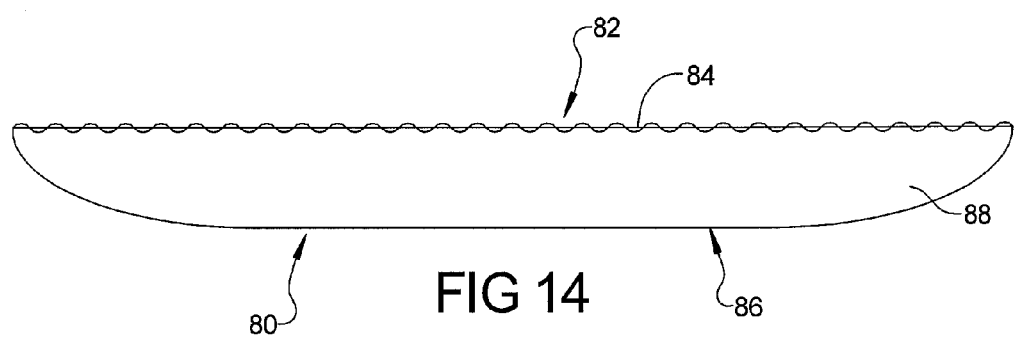
FIG. 14 is an illustrative cross-sectional view of a second alternative embodiment of the nose pad of the present invention.
Figure 15:
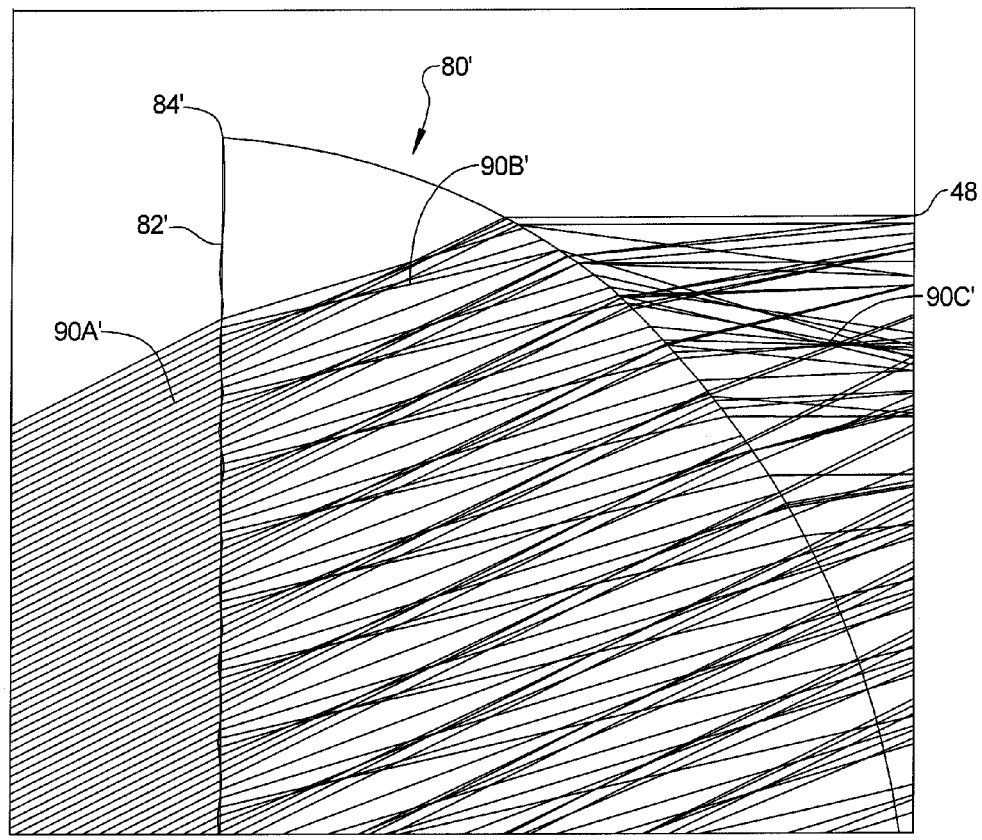
FIG. 15 is a cross-sectional view which shows the effect on incident light rays of a second alternative embodiment of the nose pad of the present invention.

Now referring to FIG. 14 an illustrative cross-sectional view of a second alternative embodiment of the nose pad 80 of the present invention is shown. The first surface 82 is shown as flat but has been modified by introducing a wavy surface in the form of a periodic undulation. Not shown is the mounting piece which would extend the first surface 82 for attachment to the nose piece extension 14A, 14B. The first, wavy surface 82 is joined to a second surface 86 by a curve portion 88. This embodiment consists of fabricating the first surface 82 of the nose pad 80 such that it has a wavy surface 84. This wavy surface will disperse incident light rays in a periodic fashion so that light exiting the second surface of the nose pad is prevented from concentrating on any spot on the nose. One embodiment is described as follows:

The wavy surface 84 is defined by cosine waves propagating in both x and y directions as follows:

$$z = A\left[\frac{1}{4}[1 + \cos(2\pi\alpha x)][1 + \cos(2\pi\beta y)] - 1\right]$$

where z is the deviation in mm in a direction perpendicular to surface 82, A is the maximum amplitude in mm of the variation and $\alpha$ and $\beta$ are the spatial frequencies of the variations in the x and y directions respectively. The point x=0, y=0 in this expression may refer to some central point on the first surface 82 of the nose pad 80. Although the (0,0) point may refer to any other point in the plane of the surface on the first surface either 82 on or off of the nose pad 80. The spatial frequencies are measured in inverse lens units (mm). Examination of the periodic expression shows that for $\alpha=\beta$, the frequencies are equal and the periodic pattern will be a set of concentric circles, which will be less than desirable. A means of producing an irregular surface with a periodic surface type is for the ratio of $\alpha/\beta$ or $\beta/\alpha$ is not an integer. In this manner the peaks of the intersections of cosine waves in the x and y directions will occur non-simultaneously to ensure a wide variation of light dispersal. The effect on parallel light rays incident on a periodic surface is shown in FIG. 15. For the wavy surface, values for A, $\alpha$, and $\beta$ of 0.02, 4, and 5 were found to produce desirable results, such as in FIG. 15. However, other values for A, $\alpha$, and $\beta$ may be equally suitable.

Now referring to FIG. 15 an illustrative cross-sectional view of a portion of the nose pad 80 showing the passage of light rays through a wavy surface 84 of the nose pad 80' is shown. The incident light rays 90A strike the first surface 82' which has a wavy surface 84'. As the light rays 90A pass through the periodic rough surface 84' they become somewhat predictably dispersed as illustrated by the dispersed light rays 90B'. In this manner, there is no area of concentrated light that strikes the wearer's nose at nose surface 48 as shown by exiting scattered light rays 90C'.

Figure 16:
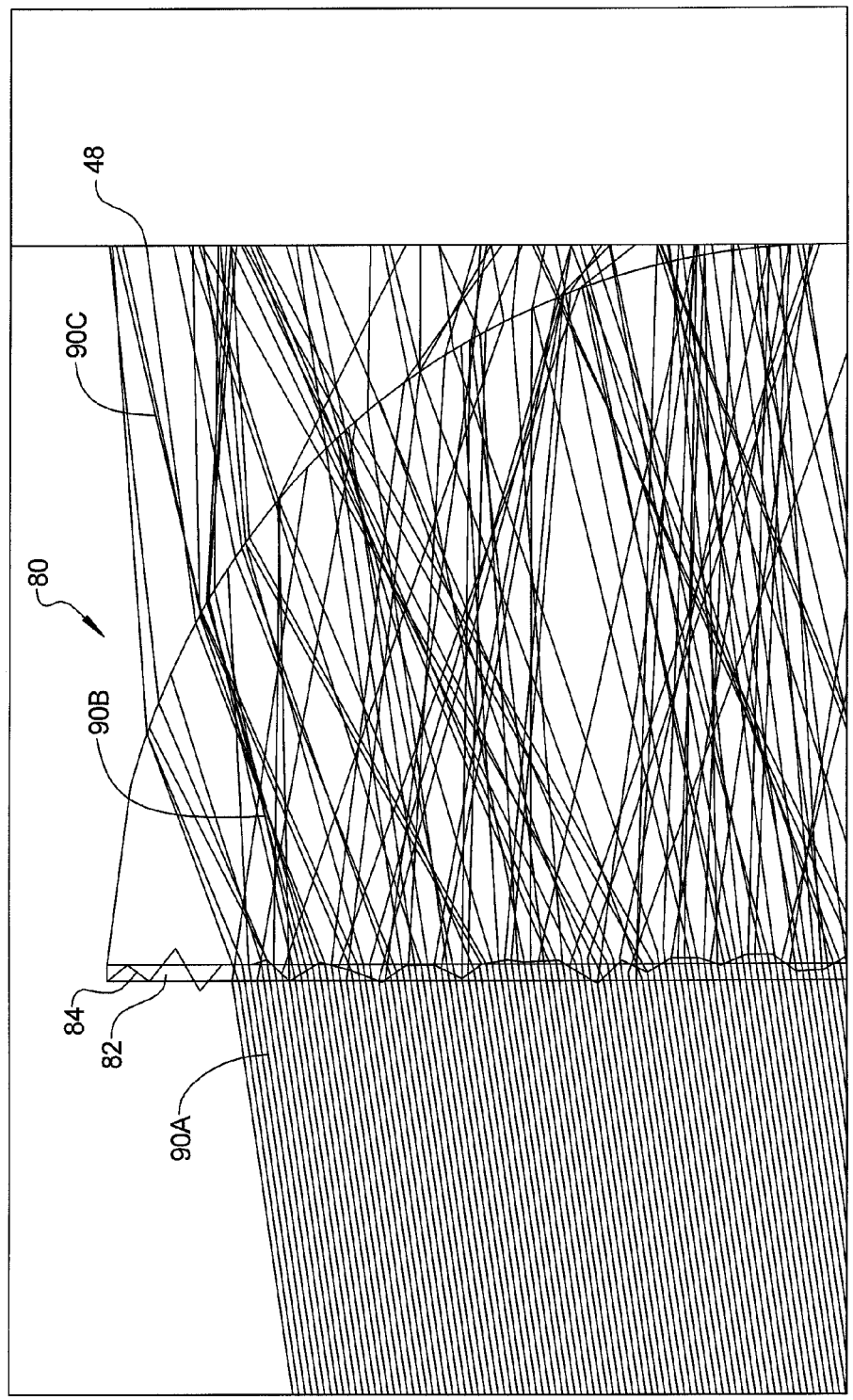
FIG. 16 is a cross-sectional view which shows the effect on incident light rays of a third alternative embodiment of the present invention.

Now referring to FIG. 16 an illustrative cross-sectional view of a portion of the nose pad 80 of a third alternative embodiment of the present invention showing the passage of light rays through a rough surface 84 of the nose pad 80' is shown. The incident light rays 90A strike the first surface 82 which has a random rough surface 84. As the light rays 90A pass through the random rough surface 84 they become scattered in a random manner as illustrated by scattered internal light rays 90B. In this manner, there is no area of concentrated light that strikes the wearer's nose at nose surface 48 as shown by exiting scattered light rays 90C. This embodiment consists of fabricating the first surface 82 of the nosepad 80 such that it has a "rough" surface 84. This rough surface will disperse incident light rays in a random fashion so that light exiting the second surface of the nose pad is prevented from concentrating on any spot on the nose. The rough surface may be embodied in many ways, all of which fall under the scope of this invention. This random effect is shown in FIG. 16. By way of example, this surface was defined by a set of uniformly distributed random numbers ranging from −0.05 mm to +0.05 mm where the variation occurs at 0.05 mm frequency. The random numbers were connected by a cubic spline curve fitting program to define the surface. Uniform distributions are known to those skilled in the mathematics of probability theory. The benefits of the random surface can be seen by comparing with a standard nose pad in which the eyeglass side of the nose pad is smooth as shown in FIG. 2. The random surface may be realized by several methods know by those skilled in the art. For example, in an injection molded nose pad, the random pattern may be affixed onto the mold by some sort of acid etching process. Alternatively, the rough surface may be imparted after the nose pad has been molded by means of sand blasting the first surface of the nose pad. Other means of imparting the rough surface are known to those skilled in the art.

Figure 17:
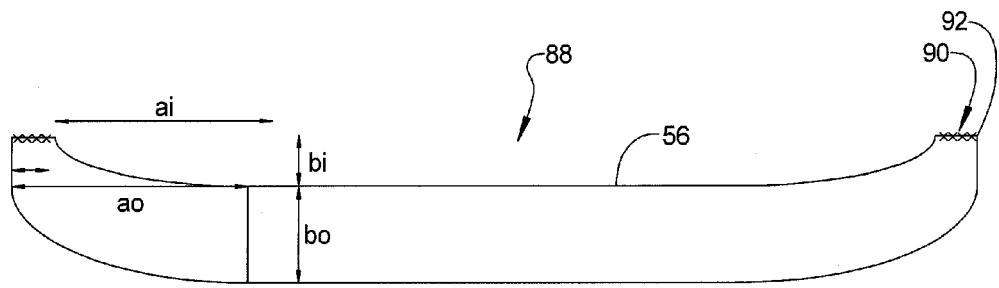
FIG. 17 is a cross-sectional view of the nose pad of a fourth alternative embodiment of the present invention.

Now referring to FIG. 17, a cross-sectional view of the nose pad 88 of a fourth alternative embodiment of the present invention is shown where the outer edge 90 has a rough surface 92 which otherwise is identical to the nose pad 50A shown in FIG. 12. The rough surface 92 addresses the case where light is incident on the nose pad 88 perpendicularly to the first surface 56 of the nose pad 88. This embodiment features the concave shape of the nose pad 50 as described above combined with the rough surface 92 which is restricted to the only the outer edge 54 of the nose pad 50 shown in FIG. 12.

What is claimed:

1. A nose pad for supporting eyeglasses on a nose, the nose pad comprising:
   a first surface including a first outer edge portion, a second outer edge portion, and a central portion provided between the first outer edge portion and the second outer edge portion;
   a second surface opposing the first surface and including a contact portion configured to contact said nose;
   wherein, the first outer edge portion, the second outer edge portion, and the central portion are configured so that light directed at the first surface and passing through the second surface is dispersed so that the light is not concentrated on said nose.
2. The nose pad of claim 1, wherein the contact portion is curved.
3. The nose pad of claim 1, wherein the contact portion is generally flat or convex.
4. The nose pad of claim 1, wherein the central portion includes a substantially flat segment extending between the first outer edge portion and the second outer edge portion.
5. The nose pad of claim 4, including a first radiused section between the first outer edge portion and the central portion, and a second radiused portion between the second outer edge portion and the central portion.
6. The nose pad of claim 1, wherein the first outer edge portion and the second outer edge portion each comprise flat segments.
7. The nose pad of claim 6, wherein the flat segments are about 0.5 mm in length.
8. The nose pad of claim 1, wherein the flat segments of the first outer edge portion and the second outer edge portion include a roughened outer surface.
9. The nose pad of claim 8, wherein the roughened outer surface is configured to reduce the intensity of light that strike the first outer edge portion and the second outer edge portion in a substantially perpendicular direction to the nose pad.
10. The nose pad of claim 1, wherein the first outer edge portion and the second outer edge portion each comprise a cusp that is substantially concave.
11. The nose pad of claim 1, wherein the first outer edge portion and the second outer edge portion, viewed in cross-section, do not include curved or rounded segments.
12. The nose pad of claim 1, wherein the nose pad includes a support structure configured to connect the nose pad to an eyeglass frame.
13. The nose pad of claim 12, wherein the support structure is configured to disperse light into a substantially uniform pattern across said nose.
14. The nose pad of claim 12, wherein the support structure is connected to an eyeglass frame.
15. The nose pad of claim 1, wherein the first outer edge portion, the central portion, and the second outer edge portion are configured to provide an uninterrupted substantially flat surface extending substantially along the entire cross-sectional length of the first surface.
16. The nose pad of claim 15, wherein the uninterrupted substantially flat surface includes a roughened or wavy outer surface.
17. The nose pad of claim 1, wherein the first surface is opaque.
18. The nose pad of claim 1, wherein the second surface is opaque.
19. The nose pad of claim 1, wherein the first surface is frosted.
20. The nose pad of claim 1, wherein the first surface is provided with a granular texture.
21. The nose pad of claim 1, wherein said first surface has a surface texture that randomly disperses light at the first surface into generally unconcentrated light intensity across said nose.
22. The nose pad of claim 1, wherein the nose pad is substantially translucent.
23. The nose pad of claim 1, wherein said nose pad is substantially comprised of silicone.
24. A nose pad for supporting eyeglasses on a nose, the nose pad comprising:
    a first surface;
    a second surface opposing the first surface and including a contact portion configured to contact said nose;
    wherein, the first surface includes a wavy surface having periodic undulations, and the wavy surface is configured so that light directed at the first surface and passing through the second surface is dispersed so that the light is not concentrated on said nose.
25. The nose pad of claim 24, wherein the wavy surface extends substantially along the entire length of the first surface.

* * * * *